United States Patent
Bae

(10) Patent No.: US 10,972,645 B1
(45) Date of Patent: Apr. 6, 2021

(54) DUAL CAMERA MODULE AND APPARATUS FOR MANUFACTURING THE SAME

(71) Applicants: Furonteer Inc, Seongnam-si (KR); Sang Shin Bae, Seoul (KR)

(72) Inventor: Sang Shin Bae, Seoul (KR)

(73) Assignees: Furonteer Inc, Seongnam-si (KR); Sang Shin BAE, Seoul (KR)

(*) Notice: Subject to any disclaimer, the term of this patent is extended or adjusted under 35 U.S.C. 154(b) by 0 days.

(21) Appl. No.: 17/106,779

(22) Filed: Nov. 30, 2020

(30) Foreign Application Priority Data

May 8, 2020 (KR) .................. 10-2020-0055362

(51) Int. Cl.
*H04N 5/225* (2006.01)

(52) U.S. Cl.
CPC .......... *H04N 5/2257* (2013.01); *H04N 5/2253* (2013.01)

(58) Field of Classification Search
CPC ........................ H04N 5/2257; H04N 5/2253
USPC ........................................ 348/374
See application file for complete search history.

(56) References Cited

U.S. PATENT DOCUMENTS

2019/0297237 A1* 9/2019 Lee .................. H04N 5/2258

FOREIGN PATENT DOCUMENTS

| KR | 20-0252099 Y1 | 11/2001 |
| KR | 10-2016-0077904 A | 7/2016 |
| KR | 10-2018-0046925 A | 5/2018 |

* cited by examiner

*Primary Examiner* — Joel W Fosselman
(74) *Attorney, Agent, or Firm* — Novick, Kim & Lee, PLLC; Jae Youn Kim; Sang Ho Lee

(57) ABSTRACT

An embodiment of the present disclosure provides a dual camera module including: a first camera module having a first optical axis; a second camera module having a second optical axis aligned with respect to the first optical axis and a second extension part extending in a direction crossing the second optical axis; a fixing member having a first accommodation part accommodating the first camera module, a second accommodation part accommodating the second camera module, and a second fixing part coupled to the second extension part; and a second adhesive part connecting the second extension part with the second fixing part to fix the second camera module to the fixing member.

8 Claims, 9 Drawing Sheets

DUAL CAMERA MODULE AND APPARATUS FOR MANUFACTURING THE SAME

TECHNICAL FIELD

Embodiments of the present disclosure relate to a dual camera module and an apparatus for manufacturing the same.

BACKGROUND ART

Camera modules, especially, camera modules mounted on portable electronic devices, have smaller numbers of pixels due to a high resolution and miniaturization of mobile phones, which are recently required. Accordingly, a picture quality is greatly deteriorated even with a slight distortion of an optical axis.

In addition, in the case of vehicle camera modules, with the introduction of automatic parking function, lane detection function, and around view monitoring, a distance to an object, a size and shape of the object, a matching rate with a driver's visual field, and a degree of image alignment between cameras are becoming very important.

Recently, as dual camera modules are applied, each camera module needs to be aligned to have the same optical axis. However, there is a problem that the optical axis is distorted while being transferred to a fixed process, after one optical axis is aligned with respect to the other camera module.

DESCRIPTION OF EMBODIMENTS

Technical Problem

To solve the above problems and/or limitations, an objective of the present disclosure is to provide a dual camera module using an instant curing adhesive and an apparatus for manufacturing the same.

Solution to Problem

An embodiment of the present disclosure provides a dual camera module including a first camera module having a first optical axis; a second camera module having a second optical axis aligned with respect to the first optical axis and a second extension part extending in a direction crossing the second optical axis; a fixing member having a first accommodation part accommodating the first camera module, a second accommodation part accommodating the second camera module, and a second fixing part coupled to the second extension part; and a second adhesive part connecting the second extension part with the second fixing part to fix the second camera module to the fixing member.

In an embodiment of the present disclosure, the first camera module may further include a first extension part extending in a direction crossing the first optical axis, wherein the fixing member further has a first fixing part coupled to the first extension part, and wherein the dual camera module further includes a first adhesive part connecting the first extension part with the first fixing part to fix the first camera module to the fixing member.

In an embodiment of the present disclosure, the first adhesive part and the second adhesive part may include inorganic materials.

In an embodiment of the present disclosure, the first adhesive part and the second adhesive part may include solder.

In an embodiment of the present disclosure, the second fixing part may have a protrusion shape protruding from a surface of the fixing member, and a second hole for accommodating the second fixing part is formed at one end of the second extension part.

In an embodiment of the present disclosure, the first fixing part may have a protrusion shape protruding from a surface of the fixing member, and a first hole for accommodating the first fixing part is formed at one end of the first extension part.

In an embodiment of the present disclosure, a diameter of the second hole may be greater than a diameter of the first hole.

In an embodiment of the present disclosure, the second fixing part may have a second groove concave from a surface of the fixing member and may receive one end of the second extension part.

In an embodiment of the present disclosure, the first fixing part may have a first groove concave from the surface of the fixing member and may receive one end of the first extension part.

In an embodiment of the present disclosure, a width of the second groove may be greater than a width of the first groove extending in the same direction as a width direction of the second groove.

An embodiment of the present disclosure provides an apparatus for manufacturing a dual camera module, the apparatus including: an optical axis alignment unit for aligning a second optical axis of a second camera module with respect to a first optical axis of a first camera module fixed to one side of a fixing member; and a second camera module fixing unit positioned adjacent to the optical axis alignment unit and fixing the second camera module to the other side of the fixing member by applying an instant curing adhesive, which is an inorganic material, between the aligned second camera module and the fixing member, wherein the second camera module has a second extension part extending in a direction crossing the second optical axis, wherein the fixing member has a first accommodation part accommodating the first camera module, a second accommodation part accommodating the second camera module, and a second fixing part coupled to the second extension part, and wherein the second camera module fixing unit applies the instant curing adhesive between the second extension part and the second fixing part.

In an embodiment of the present disclosure, the second camera module fixing unit may fix the second camera module to the fixing member by applying the instant curing adhesive from the second camera module toward the fixing member.

Other aspects, features, and advantages other than those described above will become apparent from the following drawings, claims, and detailed description of the disclosure.

Advantageous Effects of Disclosure

Embodiments of the present disclosure can effectively shorten a process time by fixing a fixing member and a second camera module with respect to each other by using soldering. In addition, according to the embodiments of the present disclosure, since the second camera module can be fixed immediately in a state in which the second camera module is aligned with a first optical axis of a first camera module, the distortion of the optical axis during the transfer of the second camera module can be effectively reduced.

MODE OF DISCLOSURE

Figure 1:
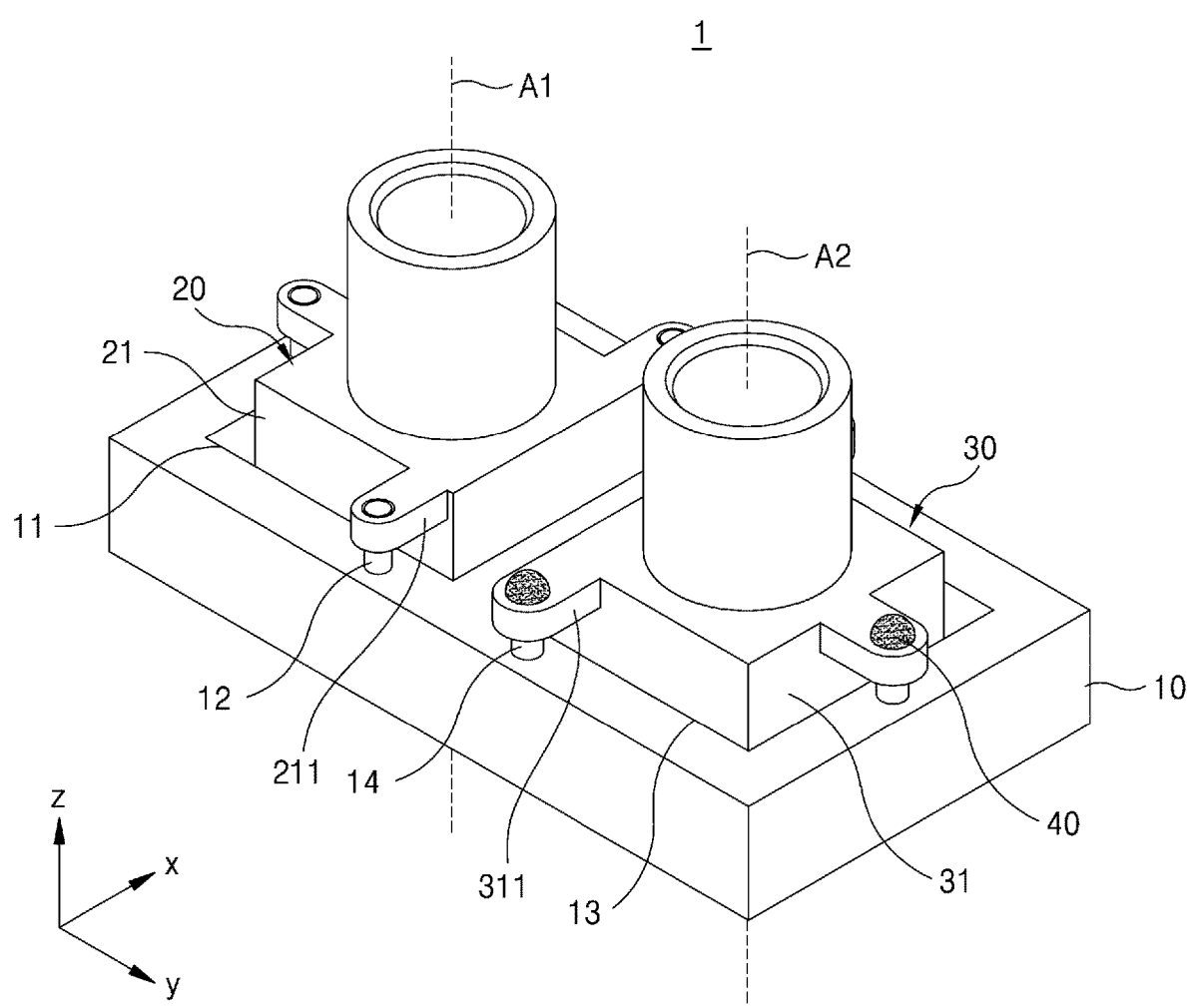
FIG. 1 is a perspective view of an example of a dual camera module to be assembled by an apparatus for manufacturing of the dual camera module according to an embodiment of the present disclosure.

Hereinafter, the following embodiments will be described in detail with reference to the accompanying drawings, and when describing with reference to the drawings, the same or corresponding constituent elements are given the same reference numerals, and redundant descriptions thereof will be omitted.

Since the present embodiments can apply various transformations, specific embodiments will be illustrated in the drawings and described in detail in the detailed description. Effects and features of the present embodiments, and a method of achieving them will be apparent with reference to the contents described later in detail together with the drawings. However, the embodiments are not limited to the embodiments disclosed below and may be implemented in various forms.

In the following embodiments, terms such as first and second are used for the purpose of distinguishing one constituent element from other constituent elements rather than a limiting meaning.

In the following examples, expressions in the singular include plural expressions unless the context clearly indicates otherwise.

In the following embodiments, terms such as "include" or "have" means that the features or components described in the specification are present, and do not preclude the possibility that one or more other features or components may be added.

In the following embodiments, when a part, such as a unit, a region, or a component, is on or on another part, not only is it directly above the other part, but also another unit, region, component, etc. is interposed therebetween.

In the following embodiments, terms such as connect or couple do not necessarily mean direct and/or fixed connection or coupling of two members, unless the context clearly indicates otherwise, and that another member is interposed between the two members.

It means that a feature or component described in the specification is present, and does not preclude the possibility that one or more other features or components may be added.

In the drawings, the size of components may be exaggerated or reduced for convenience of description. For example, the size and thickness of each component shown in the drawings are arbitrarily shown for convenience of description, and thus the following embodiments are not necessarily limited to those shown.

Figure 2:
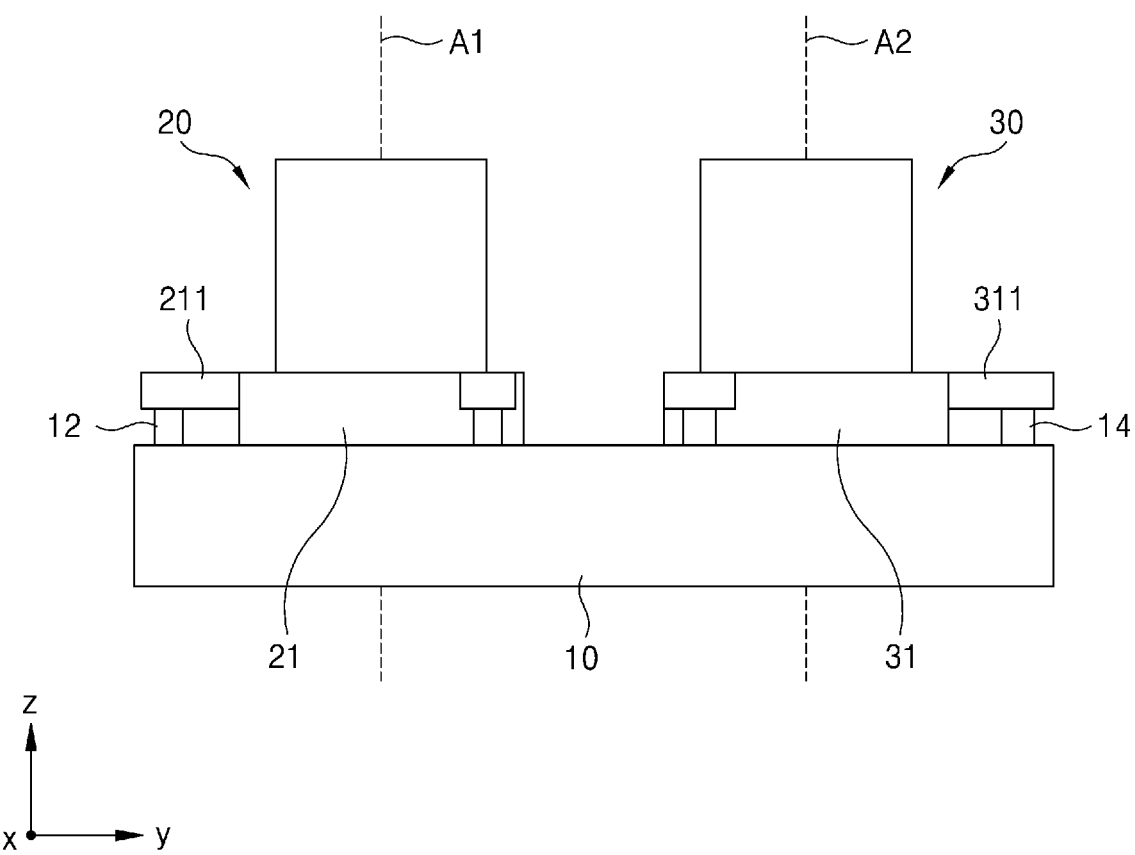
FIG. 2 is a side view of the dual camera module of FIG. 1.
Figure 3:
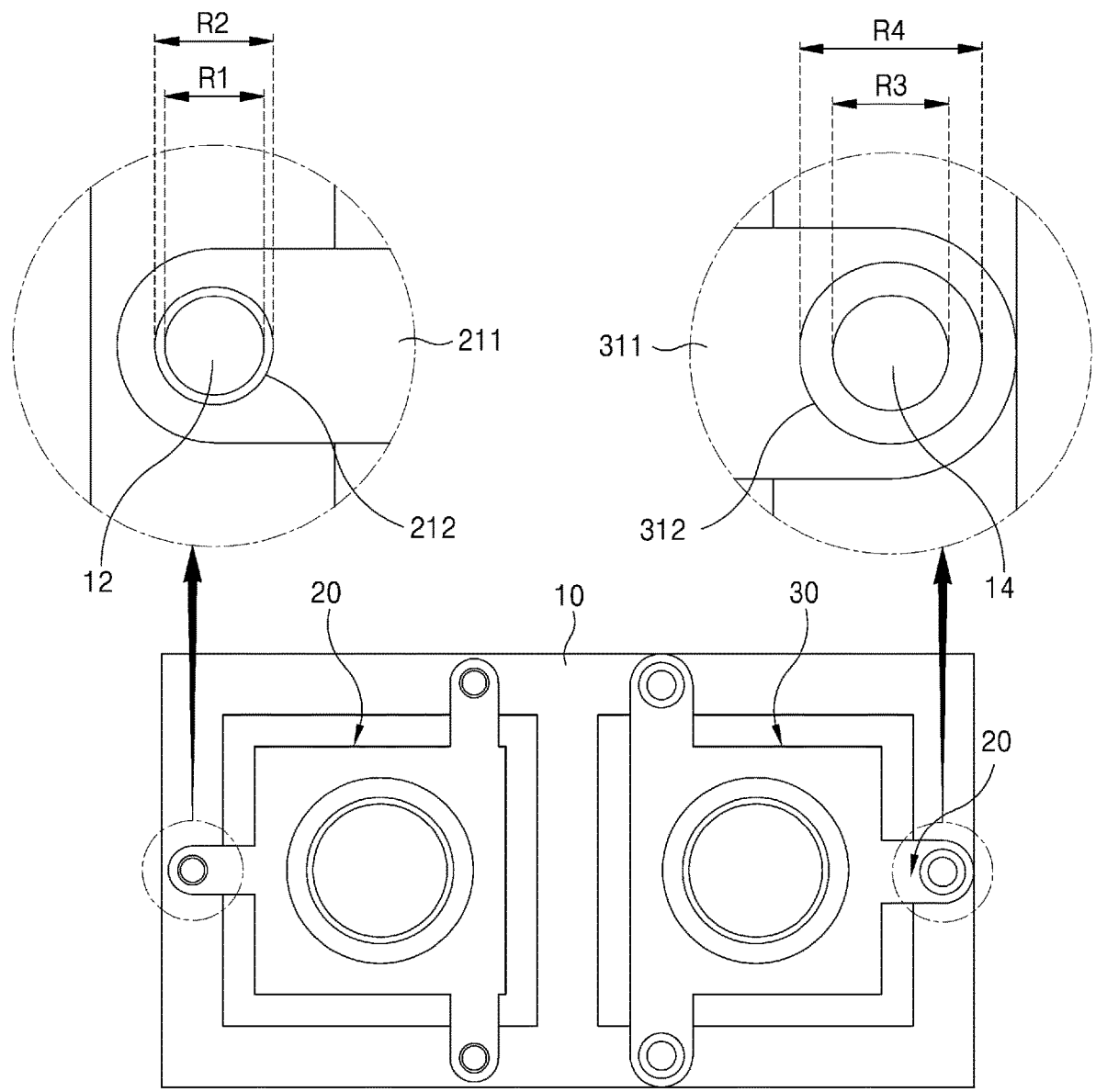
FIG. 3 is a plan view of the dual camera module.

FIG. 1 is a perspective view of an example of a dual camera module 1 to be assembled by an apparatus for manufacturing of the dual camera module according to an embodiment of the present disclosure, FIG. 2 is a side view of the dual camera module 1 of FIG. 1, and FIG. 3 is a plan view of the dual camera module 1.

Referring to FIGS. 1 to 3, the dual camera module 1 may be applied to, for example, a mobile, a personal computer (PC) and/or vehicle camera modules, and may include a fixing member 10, a first camera module 20, a second camera module 30 and a plurality of second adhesive part 40.

The fixing member 10 performs a function of fixing the first camera module 20 and the second camera module 30 together. The fixing member 10 may be formed in a bracket shape that accommodates both the first camera module 20 and the second camera module 30. The fixing member 10 may include a material capable of soldering, specifically, a metal material capable of soldering. For example, the fixing member 10 may include aluminum (Al) or may include stainless SUS having a surface coated with a metal material, such as chromium (Cr).

The fixing member 10 may include a first accommodation part 11 accommodating the first camera module 20 and a second accommodation part 13 accommodating the second camera module 30. The first accommodation part 11 may accommodate at least a portion of a side surface of the first camera module 20, and the second accommodation part 13 may accommodate at least a portion of a side surface of the second camera module 30. In this case, the first accommodation part 11 and the second accommodation part 13 may be disposed adjacent to each other along a linear direction crossing the first optical axis A1 of the first camera module 20. In other words, by the first accommodation part 11 and the second accommodation part 13, the first camera module 20 and the second camera module 30 may be fixed adjacent to each other while facing the same direction.

As an embodiment, the fixing member 10 may further include a first fixing part 12 coupled to the first camera module 20 and a second fixing part 14 coupled to the second camera module 30. The first fixing part 12 and the second fixing part 14 may have a protrusion shape protruding from a surface of the fixing member 10. In particular, the first fixing part 12 and the second fixing part 14 may protrude from an upper surface of the fixing member 10. In the drawings, the first fixing part 12 and the second fixing part 14 are shown as protrusions having a cylindrical shape, but are not limited thereto, and may be formed in any shape that can be coupled to the first camera module 20 or the second camera module 30.

In an embodiment, the first fixing part 12 and the second fixing part 14 may be formed in a shape having a same cross-sectional area along a protruding direction. In other words, the first fixing part 12 and the second fixing part 14 may have a constant diameter with respect to the protruding direction z. In an embodiment, the first fixing part 12 and the second fixing part 14 may be formed in a two-stage structure having different diameters with respect to the protruding direction. In other words, the first fixing part 12 or the second fixing part 14 according to another example embodiment may have a first region closer to the fixing member 10 and a second region further from the fixing member 10, wherein the diameter of the second region is smaller than the diameter of the first region. Through this, the first camera module 20 or the second camera module 30 may be fixed while maintaining a constant height from the surface of the fixing member 10, so that the first camera module 20 or the second camera module 30 may be more stably fixed.

The first camera module 20 may be disposed on one side of the fixing member 10, and the second camera module 30 may be disposed on the other side of the fixing member 10. As an embodiment, when one of the first camera module 20 and the second camera module 30 is a main camera module, the other may be a secondary camera module. However, the main camera module and the secondary camera module need not be distinguished, and the first camera module 20 and the second camera module 30 may be the same camera module.

Meanwhile, although not illustrated, the first camera module 20 and the second camera module 30 may each include a substrate assembly and a lens assembly. The substrate assembly may be formed in a structure in which an image sensor is coupled on a PCB substrate on which a conductive wiring pattern is formed. The lens assembly may include an actuator and a lens accommodated in the lens assembly, and the actuator may include at least an electrode pin electrically connected to the PCB substrate and/or the image sensor. The actuator may include an actuator for autofocus and/or an actuator for camera shake correction, and the actuator for autofocus and the actuator for camera shake correction may be integrally formed.

An adhesive may be applied around the image sensor on the PCB substrate, and the lens assembly may be fixed on the PCB substrate by the adhesive in an optical axis alignment with the image sensor. The first camera module 20 may have the first optical axis A1 in which the image sensor and the optical axis of the lens assembly are aligned, and the second camera module 30 may have a second optical axis A2 in which the image sensor and the optical axis of the lens assembly are aligned. In this case, the second optical axis A2 may be aligned with respect to the first optical axis A1, and specifically may be aligned parallel to the first optical axis A1.

The first camera module 20 may further include a first extension part 211 extending in a direction crossing the first optical axis A1 from a first body 21. A first hole 212 accommodating the first fixing part 12 may be formed at one end of the first extension part 211. The second camera module 30 may further include a second extension part 311 extending in a direction crossing the second optical axis A2 from a second body 31. A second hole 312 accommodating the second fixing part 14 may be formed at one end of the second extension part 311.

The first extension part 211 or the second extension part 311 is illustrated as three extension parts in the drawing, but may be formed in any structure capable of stably fixing the first camera module 20 or the second camera module 30 to the fixing member 10. In addition, although the first extension part 211 and the second extension part 311 are symmetrically arranged in the drawing, the structure is not limited thereto.

Here, a diameter R4 of the second hole 312 may be greater than a diameter R2 of the first hole 212. In this case, a diameter R1 of the first fixing part 12 and a diameter R3 of the second fixing part 14 may be the same. In other words, since the second optical axis A2 of the second camera module 30 is aligned with the first optical axis A1 of the first camera module 20, it is better to ensure that a degree of freedom of alignment of the second camera module 30 is greater than that of the first camera module 20. To this end, in the case of the dual camera module 1, the diameter R4 of the second hole 312 may be greater than the diameter R2 of the first hole 212.

A plurality of first adhesive parts (not illustrated) may connect the first extension part 211 with the first fixing part 12 to fix the first camera module 20 to the fixing member 10. The plurality of second adhesive parts 40 may connect the second extension part 311 with the second fixing part 14 to fix the second camera module 30 to the fixing member 10.

Meanwhile, the first camera module 20 may be fixed to the fixing member 10 using an adhesive, and the adhesive may include an organic material and may be, for example, epoxy. However, embodiments of the present disclosure is not limited thereto, and the first camera module 20 may be fixed by using the first adhesive part (not illustrated), which includes the inorganic material as described above. The first adhesive part fixing the first camera module 20 may include a same material as the second adhesive part 40 fixing the second camera module 30. Hereinafter, for convenience of explanation, the second adhesive part 40 will be mainly described.

The plurality of second adhesive parts 40 may locally connect the second camera module 30 with the fixing member 10 to fix the second camera module 30 to the fixing member 10. In other words, the second adhesive part 40 may be formed discontinuously. The second adhesive part 40 may include an inorganic material, and as an embodiment, may include solder. The second adhesive part 40 may include one or more metal materials selected from lead, lead-free, tin (Sn), silver (Ag), copper (Cu), a lead (Pb)-tin (Sn) mixture, a silver (Ag)-tin (Sn) mixture, a copper (Cu)-tin (Sn) mixture. The plurality of second adhesive parts 40 may be formed to correspond to a number of the second extension part 311.

Figure 4:
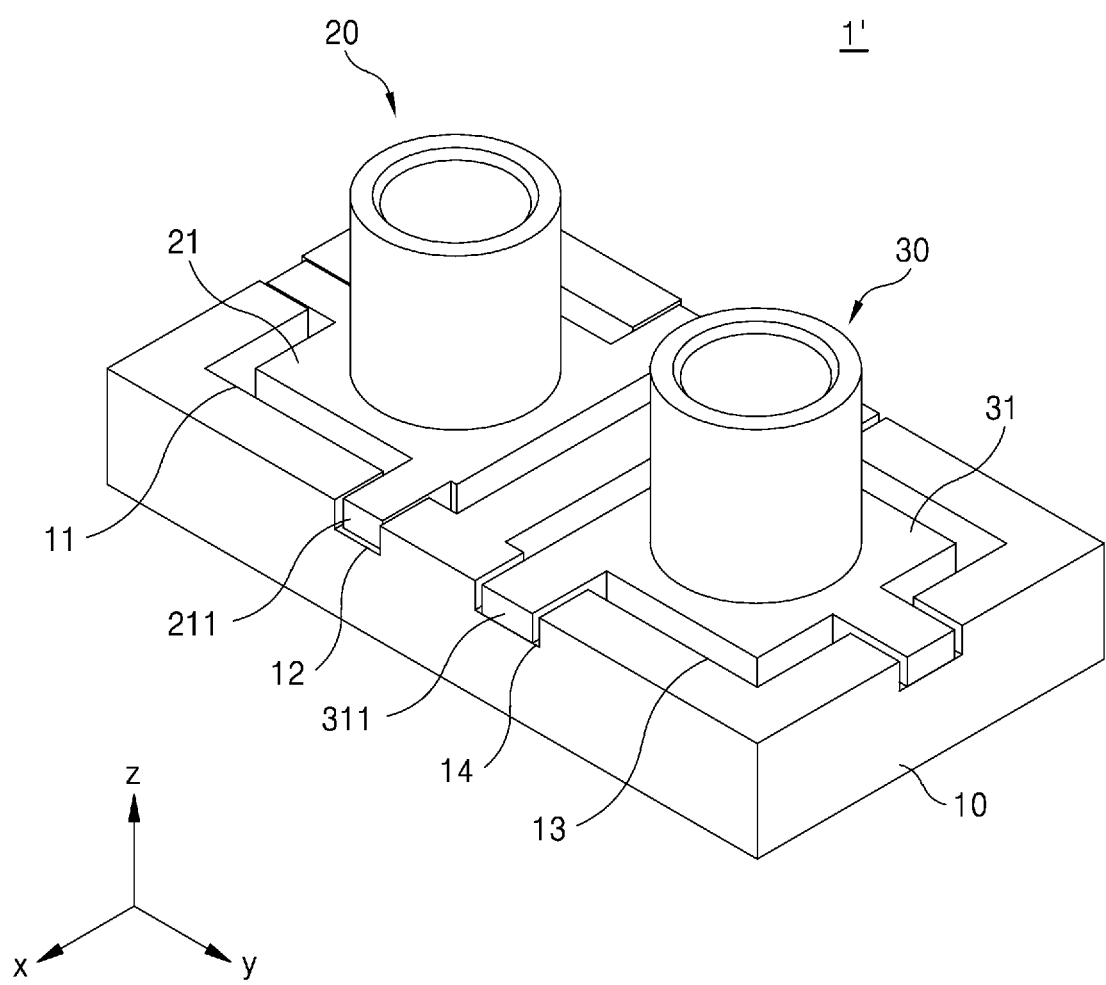
FIG. 4 is a perspective view showing a dual camera module according to another embodiment of the present disclosure.
Figure 5:
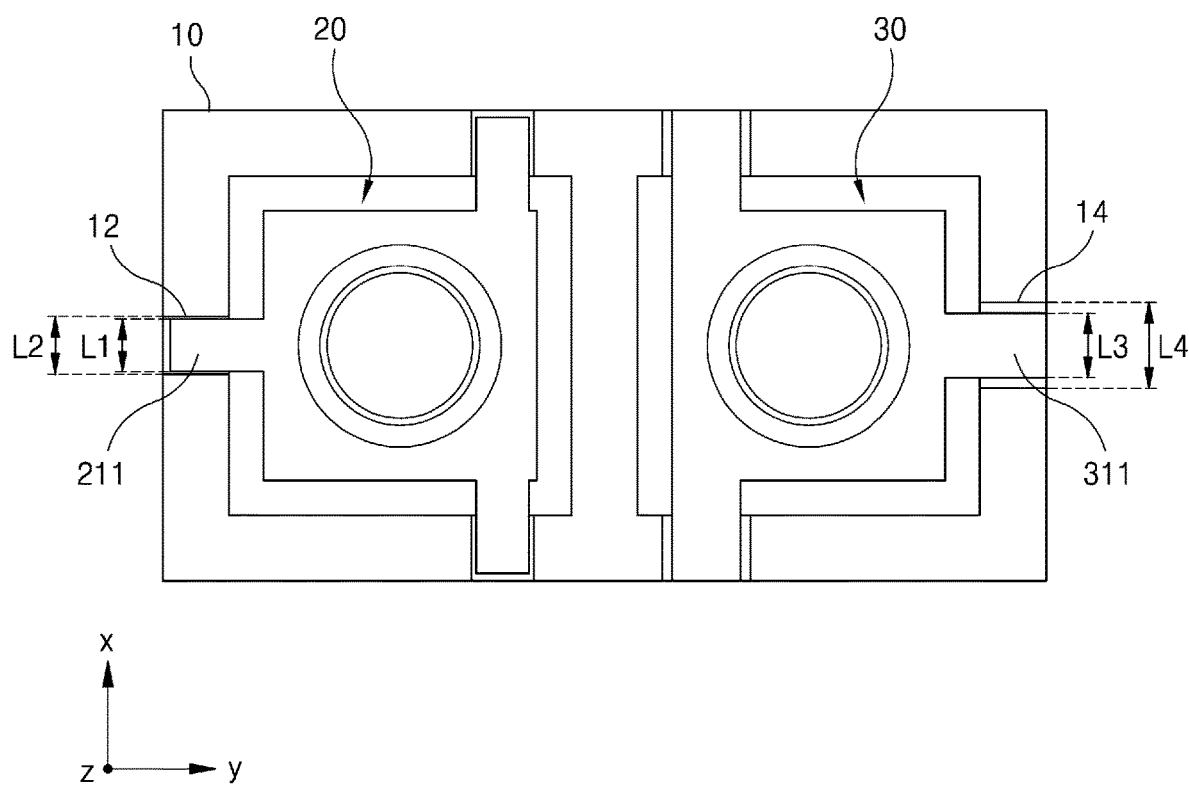
FIG. 5 is a plan view of the dual camera module of FIG. 4.

FIG. 4 is a perspective view showing a dual camera module 1' according to another embodiment of the present disclosure, and FIG. 5 is a plan view of the dual camera module 1' of FIG. 4.

Referring to FIGS. 4 and 5, a dual camera module 1' according to another embodiment may include a fixing member 10, a first camera module 20, a second camera module 30, and a plurality of second adhesive part 40. The dual camera module 1' according to another embodiment is the same as the dual camera module 1 according to the above embodiment, except for the structures of the first fixing part 12, the second fixing part 14, the first extension part 211 and the second extension part 311, so that redundant descriptions will be omitted.

The first fixing part 12 according to another embodiment may have a first groove concave from a surface of the fixing member 10 and accommodate the one end of the first extension part 211. Likewise, the second fixing part 14 may have a second groove concave from the surface of the fixing member 10 and accommodate the one end of the second extension part 311.

That is, in the first camera module 20, the first extension part 211 extending in a direction crossing a first optical axis A1 may be accommodated in the first fixing part 12 of the fixing member 10 to be coupled to the fixing member 10. In addition, in the second camera module 30, the second extension part 311 extending in a direction crossing a second optical axis A2 may be accommodated in the second fixing part 14 of the fixing member 10 to be coupled to the fixing member 10.

Here, a width L4 of the second groove may be greater than a width L2 of the first groove extending in the same direction as a width direction of the second groove. In this case, a width L1 of the first fixing part 12 and a width L3 of the second fixing part 14 may be the same. Through this, as described above, a degree of freedom of alignment of the second camera module 30 may be secured to be greater than that of the first camera module 20. The first camera module 20 or the second camera module 30 may be instantly fixed to the fixing member 10 by an instant curing adhesive after being accommodated in the first fixing part 12 or the second fixing part 14, thereby minimizing distortion of the optical axis.

Figure 6:
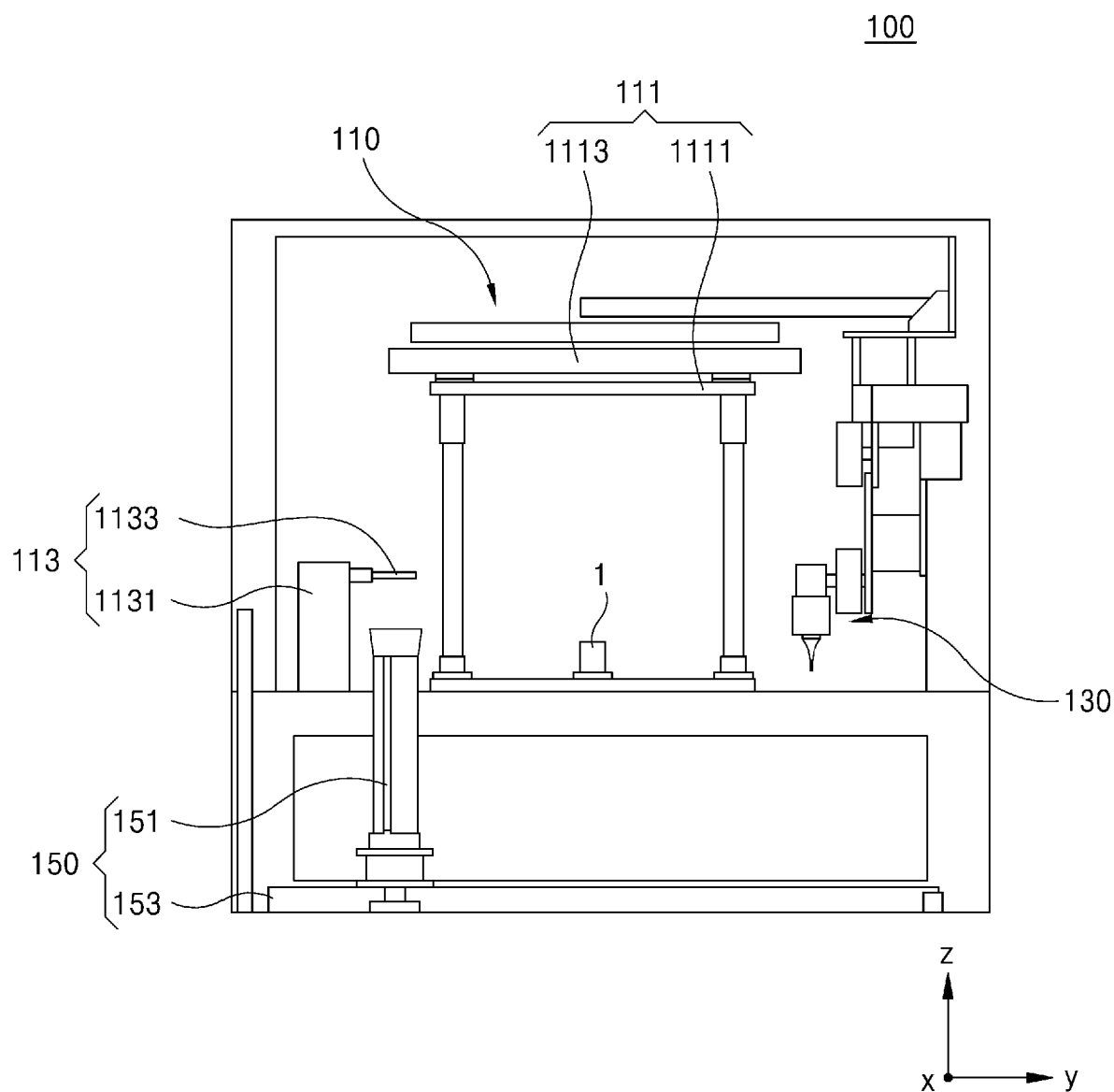
FIG. 6 is a conceptual diagram schematically showing the configuration of an embodiment of the apparatus for manufacturing of the dual camera module for assembling the dual camera module shown in FIG. 1.
Figure 7:
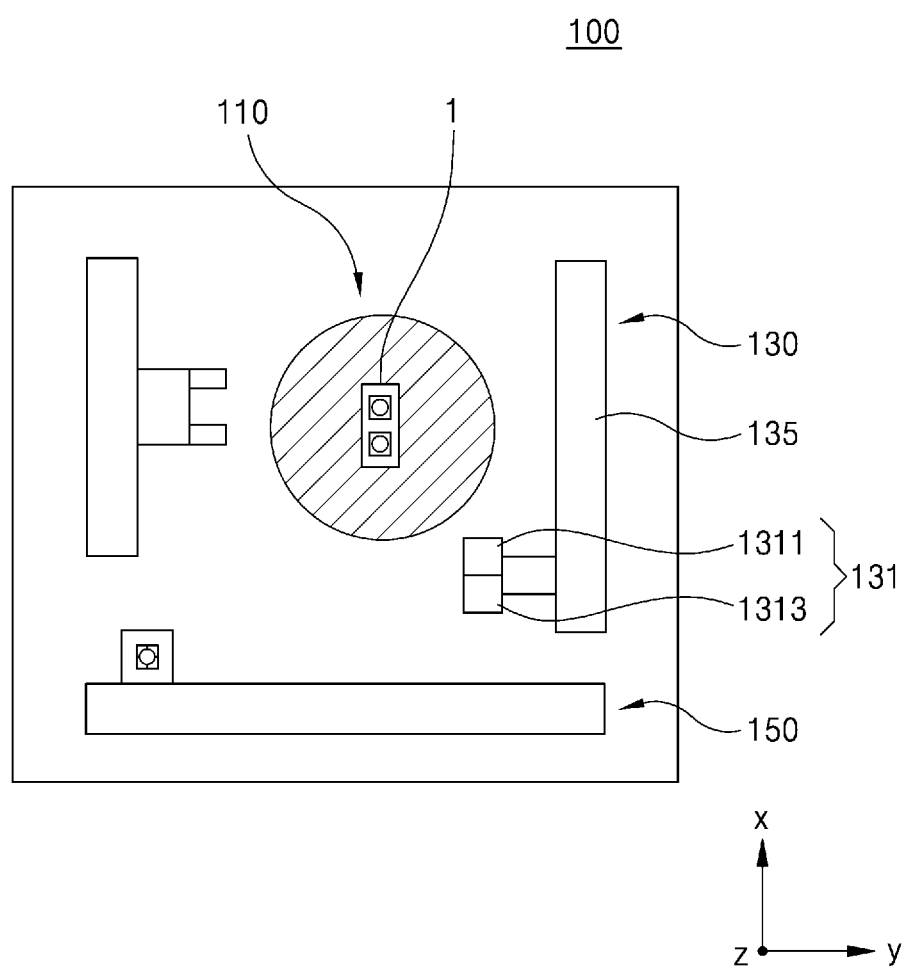
FIG. 7 is a plan view of the apparatus for manufacturing of the dual camera module shown in FIG. 6.

FIG. 6 is a conceptual diagram schematically showing the configuration of an embodiment of the apparatus 100 for manufacturing of the dual camera module for assembling the dual camera module 1 shown in FIG. 1, and FIG. 7 is a plan view of the apparatus 100 for manufacturing of the dual camera module shown in FIG. 6.

Referring to FIGS. 6 and 7, the apparatus 100 for manufacturing of a dual camera module according to an embodiment of the present disclosure may include an optical axis alignment unit 110 and a second camera module fixing unit 130.

The optical axis alignment unit 110 may align the second optical axis A2 of the second camera module 30 based on the first optical axis A1 of the first camera module 20 fixed to the one side of the fixing member 10. At this time, as an embodiment, the first camera module 20 may be fixed in advance to the one side of the fixing member 10 by an apparatus different the apparatus 100 for manufacturing of the dual camera module. Specifically, the first camera module 20 may be fixed while seated in the first accommodation part 11 of the fixing member 10. However, the present disclosure is not limited thereto, and the apparatus 100 for manufacturing the dual camera module according to another embodiment further includes a first camera module fixing unit (not illustrated), and may fix the first camera module 20 to one side of the fixing member 10 before fixing the second camera module 30.

Meanwhile, the optical axis alignment unit 110 may include an optical axis inspection unit 111 that performs an inspection so that the second optical axis A2 of the second camera module 30 may be aligned to correspond to the first optical axis A1 of the first camera module 20. The optical axis inspection unit 111 includes at least a light source 1113 and an optical axis inspection sheet 1111, and may obtain a video image of the first camera module 20, and accordingly, may align the second optical axis A2 of the second camera module 30.

That is, in a state in which the light source 1113, the optical axis inspection sheet 1111, and the first camera module 20 are sequentially arranged from above, the image sensor of the first camera module 20 may sense an image of the optical axis inspection sheet 1111 transmitted through the lens of the first camera module 20, and obtain the video image. The obtained video image may be stored in a control unit (not illustrated). Similarly, in a state in which the light source 1113, the optical axis inspection sheet 1111, and the second camera module 30 are sequentially arranged from above, the image sensor of the second camera module 30 disposed adjacent to the first camera module 20 may sense the image of the optical axis inspection sheet 1111. The control unit (not illustrated) may inspect the second optical axis A2 of the second camera module 30 by comparing the video image of the second camera module 30 with the video image of the first camera module 20.

The light source 1113 may radiate light downward in FIG. 6, that is, toward the dual camera module 1, and the optical axis inspection sheet 1111 may be disposed on a path of the light. The optical axis inspection sheet 1111 may include a light-transmitting film in which an inspection pattern capable of inspecting the first camera module 20 and the second camera module 30 is formed, for example, the inspection pattern may be formed to evaluate the resolutions of the first camera module 20 and the second camera module 30. The optical axis inspection sheet 1111 may be coupled to the light source 1113 by a fixing device. However, the present disclosure is not limited thereto, and the light source 1113 and the optical axis inspection sheet 1111 may be integrally formed. For example, the inspection pattern may be printed on a surface of the light source 1113.

The optical axis alignment unit 110 may further include a first gripping unit 113 that grips the second camera module 30 and aligns the second optical axis A2 with the first optical axis A1. The first gripping unit 113 may be electrically connected to the control unit (not illustrated) in which the video image of the first camera module 20 is stored. The control unit (not illustrated) may inspect the second optical axis A2 of the second camera module 30 by using the stored video image and the image sensed by the second camera module 30, and may control the first gripping unit 113 to align the second optical axis A2 with the first optical axis A1. For example, the control unit (not illustrated) may align the second camera module 30 by controlling the first gripping unit 113 so that the second optical axis A2 is parallel to the first optical axis A1. The first gripping unit 113 may include a first guide 1131 extending along one direction and a first gripper 1133 provided to grip the second camera module 30 while reciprocating along the first guide 1131 or reciprocating in a direction perpendicular to the one direction.

The second camera module fixing unit 130 may be positioned adjacent to the optical axis alignment unit 110. The second camera module fixing unit 130 may fix the second camera module 30 on the other side of the fixing member 10 by applying the instant curing adhesive between the second camera module 30 aligned by the optical axis alignment unit 110 and the fixing member 10. At this time, the instant curing adhesive may include an inorganic material, for example, may include solder. The second camera module fixing unit 130 may be a soldering unit. The second camera module fixing unit 130 may fix the second camera module 30 while the second camera module 30 is seated on the second accommodation part 13 of the fixing member 10.

The second camera module fixing unit 130 may include a second guide 135 extending along one direction and an adhesive application unit 131 for reciprocating along the second guide 135 or reciprocating in a direction perpendicular to the one direction to apply the instant curing adhesive between the second camera module 30 and the fixing member 10. In the drawing, the second guide 135 is disposed parallel to the extending direction of the first guide 1131, but in another embodiment, the second guide 135 may be disposed in a direction perpendicular to the extending direction of the first guide 1131.

The adhesive application unit 131 may include an adhesive supply unit 1311 for supplying the adhesive and a heating unit 1313 for applying heat to the adhesive supplied from the adhesive supply unit 1311. The adhesive supply unit 1311 and the heating unit 1313 may be moved while being coupled to each other, and may fix the second camera module 30 by supplying the adhesive and simultaneously applying heat between the second camera module 30 and the fixing member 10. The adhesive supply unit 1311 may supply the adhesive including at least one metal material selected from lead, lead-free, tin (Sn), silver (Ag), copper (Cu), lead (Pb)-tin (Sn) mixture, silver (Ag)-tin (Sn) mixture, and copper (Cu)-tin (Sn) mixture in the form of solder, cream solder, and solder balls. The heating unit 1313 may include an iron or a laser capable of supplying heat to the adhesive. However, the adhesive supply unit 1311 and the heating unit 1313 are not limited to the above type, and the adhesive application unit 131 may be changed to another type of soldering method using the instant curing adhesive.

The second camera module fixing unit 130 may fix the second camera module 30 to the fixing member 10 by applying the adhesive between the second camera module 30 and the fixing member 10, more specifically, between the second fixing part 14 and the second extension part 311. In an embodiment, the second camera module fixing unit 130 may apply the adhesive on the second hole 312 formed in the second extension part 311 (see FIG. 3). When the adhesive is applied using soldering, the adhesive may instantly impart a fixing force between the second hole 312 and the second fixing part 14, thereby reducing a process time.

When an adhesive containing an organic material, such as epoxy, is used, the adhesive does not penetrate well between the fixing member 10 and the second camera module 30, so that the adhesive force may be reduced. As such, the second optical axis A2 may be distorted during transfer to a thermal curing oven for curing. According to an example embodiment of the present disclosure, the distortion of the second optical axis A2 of the second camera module 30 may be minimized by using the instant curing adhesive that instantly imparts a fixing force, that is, the adhesive including the solder.

Meanwhile, in an embodiment, a transfer unit 150 may be further included. The transfer unit 150 may include a third guide 153 extending in a direction different from the extension direction of the first gripping unit 113 and a transfer 151 accommodating at least the second camera module 30 and moves along the third guide 153. The transfer unit 150 may transfer, for example, the first camera module 20, the fixing member 10 to which the first camera module 20 is fixed, and the second camera module 30, or may transfer the dual camera module 1.

Figure 8A:
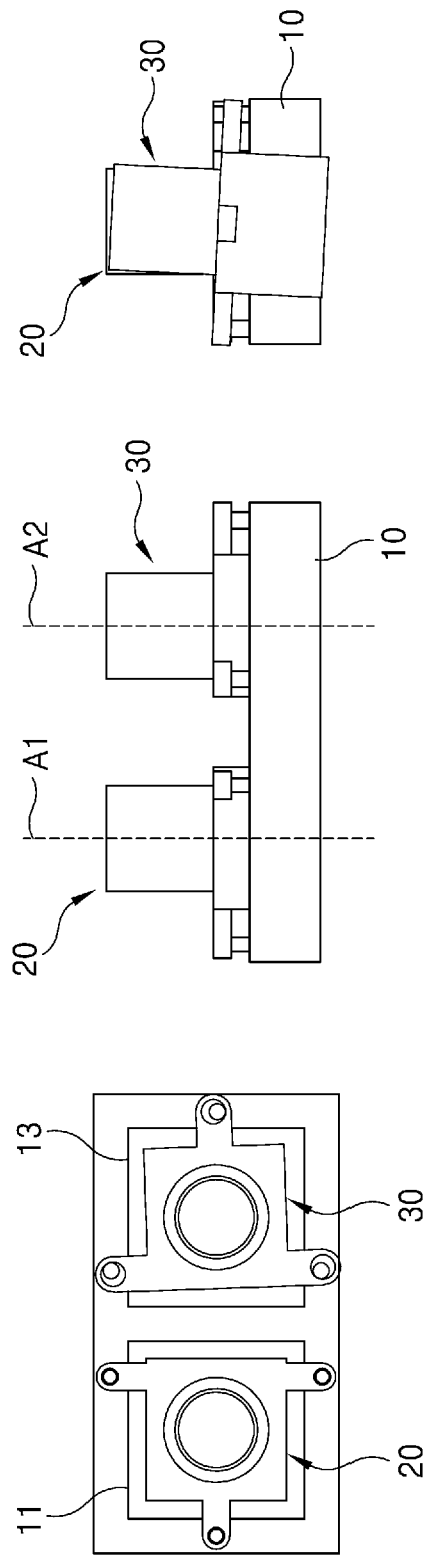
FIGS. 8A-8C are conceptual diagrams schematically showing a method of manufacturing the dual camera module using the apparatus for manufacturing of the dual camera module shown in FIG. 6.
Figure 8C:
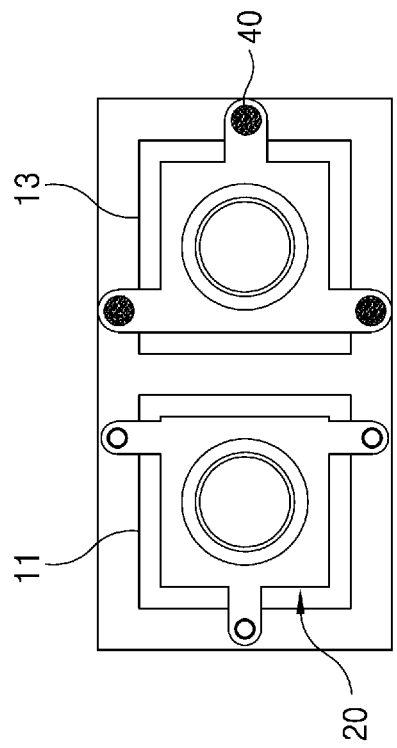
Figure 8B:
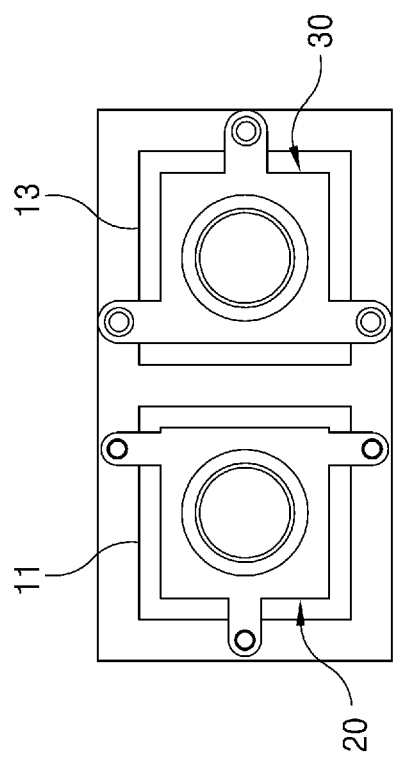
Figure 9:
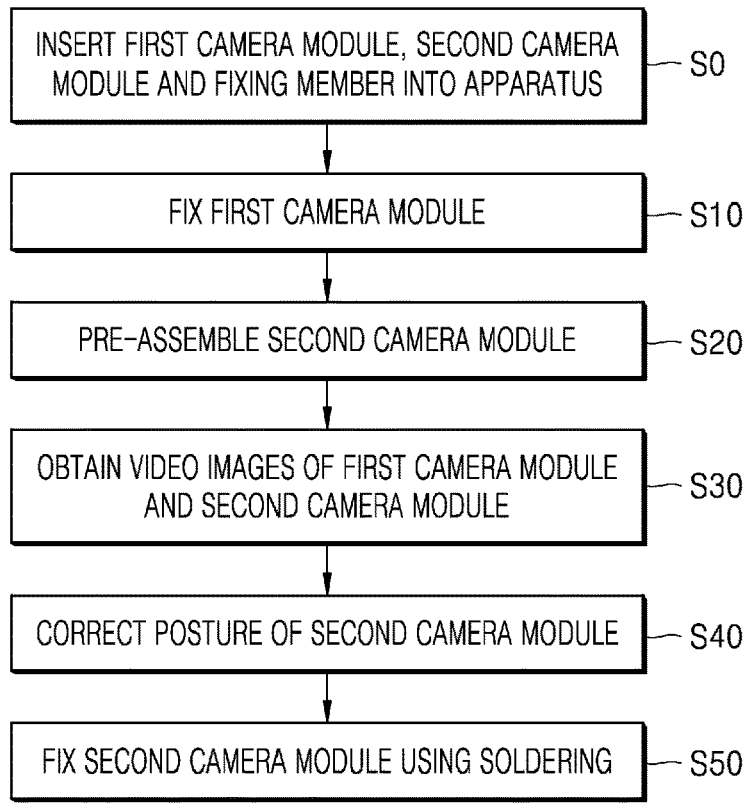
FIG. 9 is a flowchart of a method of manufacturing a dual camera module according to an embodiment of the present disclosure.
Figure 10:
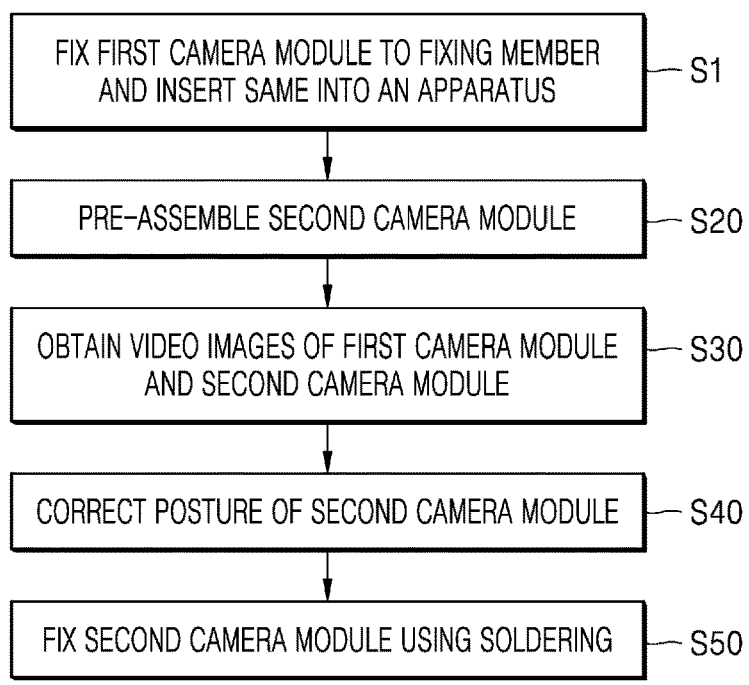
FIG. 10 is a flowchart of a method of manufacturing a dual camera module according to another embodiment of the present disclosure.

FIGS. 8A-8C are conceptual diagrams schematically showing a method of manufacturing the dual camera module using the apparatus 100 for manufacturing of the dual camera module shown in FIG. 6, FIG. 9 is a flowchart of a method of manufacturing a dual camera module according to an embodiment of the present disclosure, and FIG. 10 is a flowchart of a method of manufacturing a dual camera module according to another embodiment of the present disclosure.

Referring to FIG. 8A and FIG. 9, the first camera module 20, the second camera module 30, and the fixing member 10 are inserted into an apparatus (see S0). In this case, the first camera module 20 and the second camera module 30 may be inserted without being unfixed to the fixing member 10 (see S0). Thereafter, the first camera module 20 is fixed to the one side of the fixing member 10 (see S10). The fixing member 10, as described above, may be formed in a bracket shape including the first accommodation part 11 and the second accommodation part 13, and the first camera module 20 may be settle to the first accommodation part 11 of the fixing member 10.

In this case, the first extension part of the first camera module 20 may be coupled to the first fixing part of the fixing member 10. The first camera module 20 may be fixed to the fixing member 10 by means of a UV curing adhesive, for example. However, the present disclosure is not limited thereto, and the first camera module 20 may be fixed to the fixing member 10 by the instant curing adhesive.

In an embodiment, referring to FIG. 8A and FIG. 10, the first camera module 20 may be fixed to the fixing member 10 before being introduced into the apparatus. That is, the first camera module 20 may be fixed to the one side of the fixing member 10 through a separate process outside the apparatus, and the fixing member 10 to which the first camera module 20 is fixed may be introduced into the apparatus.

Next, referring to FIG. 8B, FIG. 9 and FIG. 10, after the fixing member 10 to which the first camera module 20 has been fixed is transferred to the optical axis alignment unit 110, the optical axis alignment unit 110 may mount the second camera module 30 on the second accommodation part 13 of the fixing member 10 (see S20). Thereafter, the optical axis alignment unit 110 obtains the video images of the first camera module 20 and the second camera module 30 using the optical axis inspection unit 111 (see S30). At this time, the second camera module 30 is seated in the second accommodation part 13 but not fixed, and the second optical axis A2 of the second camera module 30 may be not aligned with the first optical axis A1 of the first camera module 20 (see FIG. 8A). The optical axis alignment unit 110 may align the second optical axis A2 of the second camera module 30 based on the video image of the first camera module 20 (see S22), and may correct a posture by aligning the second camera module 30 so that the second optical axis A2 is parallel to the first optical axis A1 (see S40).

Next, referring to FIG. 8C, FIG. 9 and FIG. 10, an adhesive, which is an inorganic material, is applied between the aligned second camera module 30 and the fixing member 10, so that the second camera module 30 is fixed to the other side of the fixing member 10 (see S30). As an embodiment, the second camera module fixing unit 130 solders the second camera module 30 to the fixing member 10. The second camera module fixing unit 130 may supply the instant curing adhesive discontinuously between the second fixing part 14 of the fixing member 10 and the second extension part 311 of the second camera module using the adhesive supply part 1311. The adhesive, which is an inorganic material, does not have an adhesive force in a solid state. However, when heat is applied to the adhesive by the heating unit 1313, which is positioned adjacent thereto, the adhesive may have the adhesive force. The adhesive has fluidity and an adhesive force by the heating unit 1313, and instantly connects and fixes between the fixing member 10 and the second camera module 30.

On the other hand, the manufacturing method of the dual camera module was described as a case of fixing the second camera module 30 after fixing the first camera module 20, but In an embodiment, the first camera module 20 and the second camera module 30 may be fixed to the fixing member 10 at the same time by the instant curing adhesive. At this time, the first camera module 20 is not fixed while the first optical axis is measured, and the first camera module 20 and the second camera module 30 may be simultaneously fixed by the adhesive after the second optical axis of the second camera module is aligned with respect to the first optical axis of the first camera module 20.

As described above, in embodiments of the present disclosure, the fixing may be performed by using the instant curing adhesive, for example, soldering. The instant curing adhesive may be an inorganic material. Accordingly, the point at which the adhesive is applied may be minimized. In addition, in the case of the embodiments of the present disclosure, when the heat of the heating unit 1313 is removed, the adhesive is immediately hardened so that the fixing member 10 and the second camera module 30 may be fixed, so that the process time may be effectively shortened. In addition, according to embodiments of the present disclosure, the second camera module may be fixed immediately while the second camera module 30 is aligned with the first optical axis A1 of the first camera module 20. Accordingly, the defect that the optical axis is distorted during the transfer of the second camera module 30 may be effectively reduced.

The apparatus for manufacturing and method of the dual camera module of the present disclosure is not applied only to the assembly of the dual camera module 1 described above, but may be applied to the assembly of other types of dual camera modules.

Hereinbefore, embodiments of the present disclosure have been provided. Those of ordinary skill in the art to which the present disclosure pertains will understand that the present disclosure may be implemented in a modified form without departing from the essential characteristics of the present disclosure. Therefore, the disclosed embodiments should be considered from an illustrative point of view rather than a limiting point of view. The scope of the present disclosure is shown in the claims rather than the above description, and all differences within the scope should be construed as being included in the disclosure.

The invention claimed is:

1. A dual camera module comprises:
a first camera module having a first optical axis and including a first extension part extending in a direction crossing the first optical axis, wherein the first extension part has a first hole;
a second camera module having a second optical axis aligned with respect to the first optical axis and including a second extension part extending in a direction crossing the second optical axis, wherein the second extension part has a second hole, and wherein a diameter of the second hole is greater than a diameter of the first hole;
a fixing member having a first accommodation part accommodating the first camera module, a second accommodation part accommodating the second camera module, a first fixing part having a protrusion shape protruding to be inserted into the first hole, and a second fixing part having a protrusion shape to be inserted into the second hole, wherein the second fixing part has a diameter smaller than the diameter of the second hole so that a posture of the second camera module is corrected while the second fixing part is inserted into the second hole;
a first adhesive part connecting the first extension part with the first fixing part to fix the first camera module; and
a second adhesive part connecting the second extension part with the second fixing part to fix the second camera module whose posture is corrected to the fixing member.

2. The dual camera module of claim 1, wherein a difference between the diameter of the second fixing part and the diameter of the second hole is greater than a difference between the diameter of the first fixing part and the diameter of the first hole.

3. The dual camera module of claim 1, wherein each of the first adhesive part and the second adhesive part includes an inorganic material.

4. The dual camera module of claim 3, wherein each of the first adhesive part and the second adhesive part includes solder.

5. A dual camera module comprises:
a first camera module having a first optical axis and including a first extension part extending in a direction crossing the first optical axis;
a second camera module having a second optical axis aligned with respect to the first optical axis and including a second extension part extending in a direction crossing the second optical axis;
a fixing member having a first accommodation part accommodating the first camera module, a second accommodation part accommodating the second camera module, a first groove having a concave shape for receiving the first extension part, and a second groove having a concave shape for receiving the second extension part, wherein the second groove has a width greater than a width of the first groove so that a posture of the second camera module is corrected while the second extension part is received;
a first adhesive part connecting the first extension part with the first groove to fix the first camera module to the fixing member; and
a second adhesive part connecting the second extension part with the second groove to fix the second camera module whose posture is corrected to the fixing member.

6. The dual camera module of claim 5, wherein a difference between a width of the second extension part and the width of the second groove is greater than a difference between a width of the first extension part and the width of the first groove.

7. An apparatus for manufacturing a dual camera module comprises:
an optical axis alignment unit for aligning a second optical axis of a second camera module by correcting a posture of the second camera module based on a first optical axis of a first camera module while the first camera module is fixed to one side of a fixing member; and
a second camera module fixing unit positioned adjacent to the optical axis alignment unit and fixing the second camera module to the other side of the fixing member by applying an inorganic instant curing adhesive between the aligned second camera module and the fixing member,
wherein the first camera module has a first extension part extending in a direction crossing the first optical axis and having a first hole, wherein the second camera module has a second extension part extending in a direction intersecting with the second optical axis and having a second hole, wherein a diameter of the second hole is greater than a diameter of the first hole,
the fixing member has a first accommodation part accommodating the first camera module, a second accommodation part accommodating the second camera module, a first fixing part having a protrusion shape protruding to be inserted into the first hole, and a second fixing part having a protrusion shape to be inserted into the second hole,
wherein the second fixing part has a diameter smaller than the diameter of the second hole so that a posture of the second camera module is corrected while the second fixing part is inserted into the second hole, and the second camera module fixing unit applies the instant curing adhesive between the second extension part and the second fixing part to fix the second camera module whose posture is corrected by the optical axis alignment unit to the fixing member.

8. The apparatus of claim 7, wherein the second camera module fixing unit fixes the second camera module to the fixing member by applying the instant curing adhesive in a direction from the second camera module toward the fixing member.

* * * * *